(12) United States Patent
Provost et al.

(10) Patent No.: US 10,913,181 B2
(45) Date of Patent: Feb. 9, 2021

(54) METHOD FOR MANUFACTURING A PREFORM FOR COMPOSITE MATERIALS

(71) Applicant: SAFRAN NACELLES, Gonfreville l'Orcher (FR)

(72) Inventors: Benjamin Provost, Gonfreville l'Orcher (FR); Bertrand Desjoyeaux, Gonfreville l'Orcher (FR); Sébastien Louchard, Gonfreville l'Orcher (FR); Fabien Depeux, Gonfreville l'Orcher (FR)

(73) Assignee: Safran Nacelles, Gonfreville l'Orcher (FR)

(*) Notice: Subject to any disclaimer, the term of this patent is extended or adjusted under 35 U.S.C. 154(b) by 0 days.

(21) Appl. No.: 16/793,523

(22) Filed: Feb. 18, 2020

(65) Prior Publication Data

US 2020/0180188 A1 Jun. 11, 2020

Related U.S. Application Data

(60) Division of application No. 16/240,092, filed on Jan. 4, 2019, now Pat. No. 10,654,194, which is a
(Continued)

(30) Foreign Application Priority Data

Jul. 6, 2016 (FR) ...................................... 16 56501

(51) Int. Cl.
*B32B 1/08* (2006.01)
*B29B 11/16* (2006.01)
(Continued)

(52) U.S. Cl.
CPC .............. *B29B 11/16* (2013.01); *B29C 70/30* (2013.01); *B32B 1/08* (2013.01); *B32B 5/12* (2013.01);
(Continued)

(58) Field of Classification Search
CPC . B29C 70/30; B29B 11/16; B29K 2105/0872; B29L 2031/3076; B32B 1/08; B32B 2605/18; B32B 5/12; B64C 7/02; B64D 29/00; B64F 5/10; F02C 7/04; Y02T 50/40
See application file for complete search history.

(56) References Cited

U.S. PATENT DOCUMENTS

2015/0174833 A1* 6/2015 Desjoyeaux ............ B29C 70/30
264/241

FOREIGN PATENT DOCUMENTS

FR 3000969 7/2014

* cited by examiner

*Primary Examiner* — Yan Lan
(74) *Attorney, Agent, or Firm* — Burris Law, PLLC

(57) ABSTRACT

A method for manufacturing a preform has a non-developable end shape having, about a longitudinal axis (A), an end overall radius of curvature (R2), and, in at least a longitudinal section, curved segments forming bending radii linking straight segments. The method includes a step of depositing successive layers giving the preform an initial substantially rotational shape having, about the longitudinal axis (A), an initial overall radius of curvature, then a step of deploying the preform by increasing the initial overall radius of curvature until the end overall radius of curvature is reached (R2), in order to close the bending radii of the curved segments.

14 Claims, 5 Drawing Sheets

Related U.S. Application Data continuation of application No. PCT/FR2017/051835, filed on Jul. 5, 2017.

(51) Int. Cl.
| | | |
|---|---|---|
| *B64D 29/00* | (2006.01) | |
| *B32B 5/12* | (2006.01) | |
| *B29C 70/30* | (2006.01) | |
| *B64F 5/10* | (2017.01) | |
| *B64C 7/02* | (2006.01) | |
| *B29K 105/08* | (2006.01) | |
| *B29L 31/30* | (2006.01) | |
| *F02C 7/04* | (2006.01) | |

(52) U.S. Cl.
CPC ............. *B64D 29/00* (2013.01); *B64F 5/10* (2017.01); *B29K 2105/0872* (2013.01); *B29L 2031/3076* (2013.01); *B32B 2605/18* (2013.01); *B64C 7/02* (2013.01); *F02C 7/04* (2013.01)

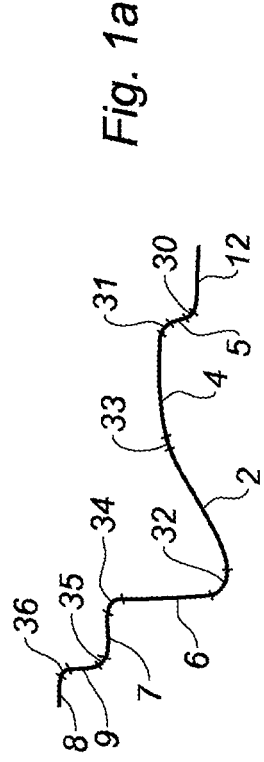
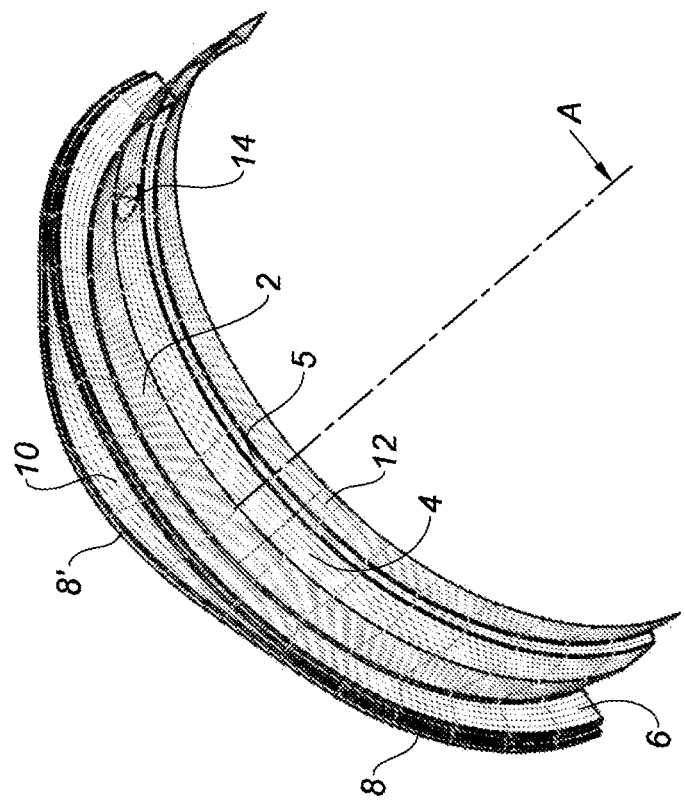
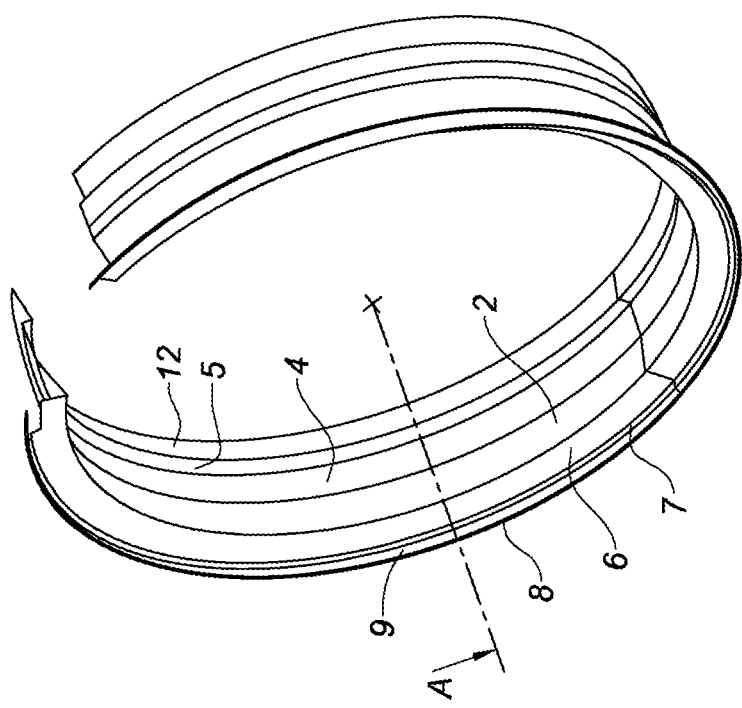

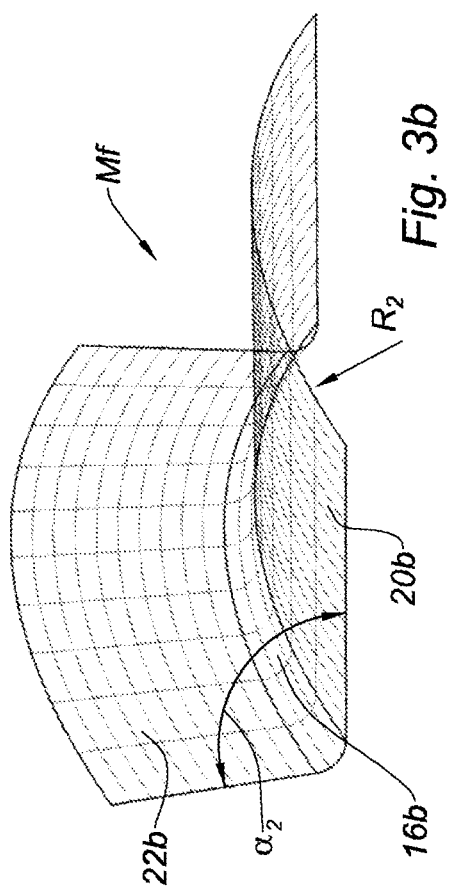
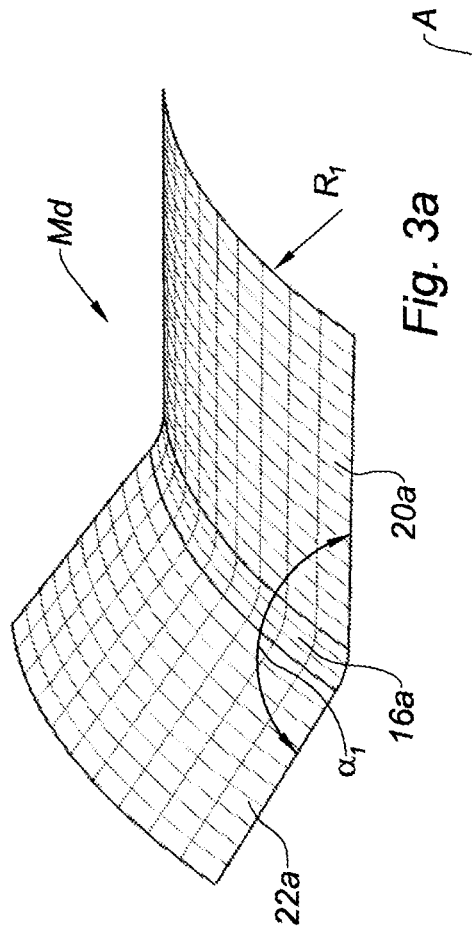
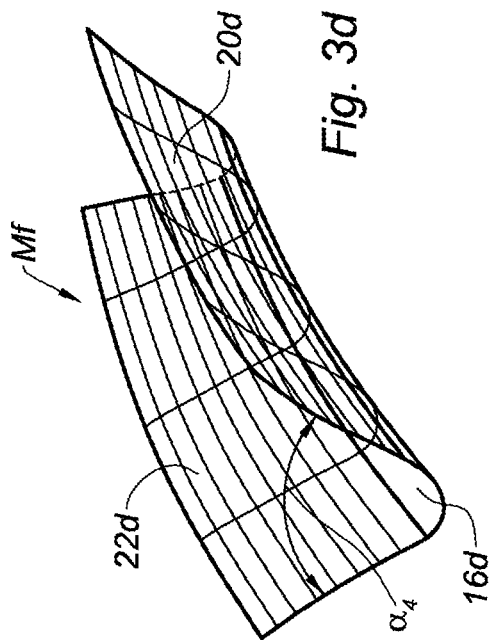
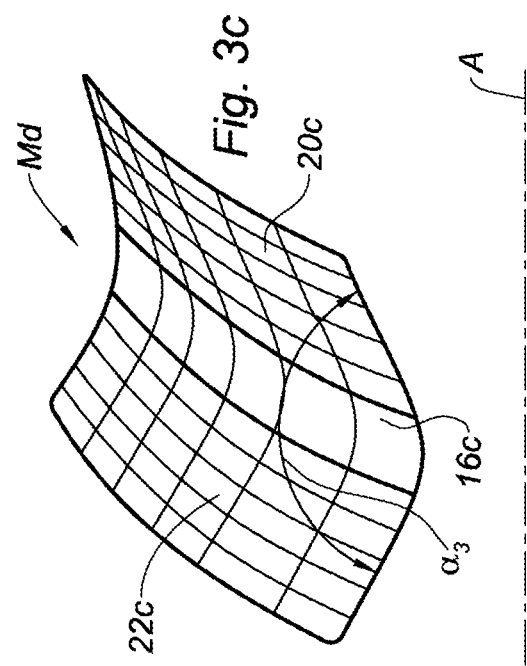

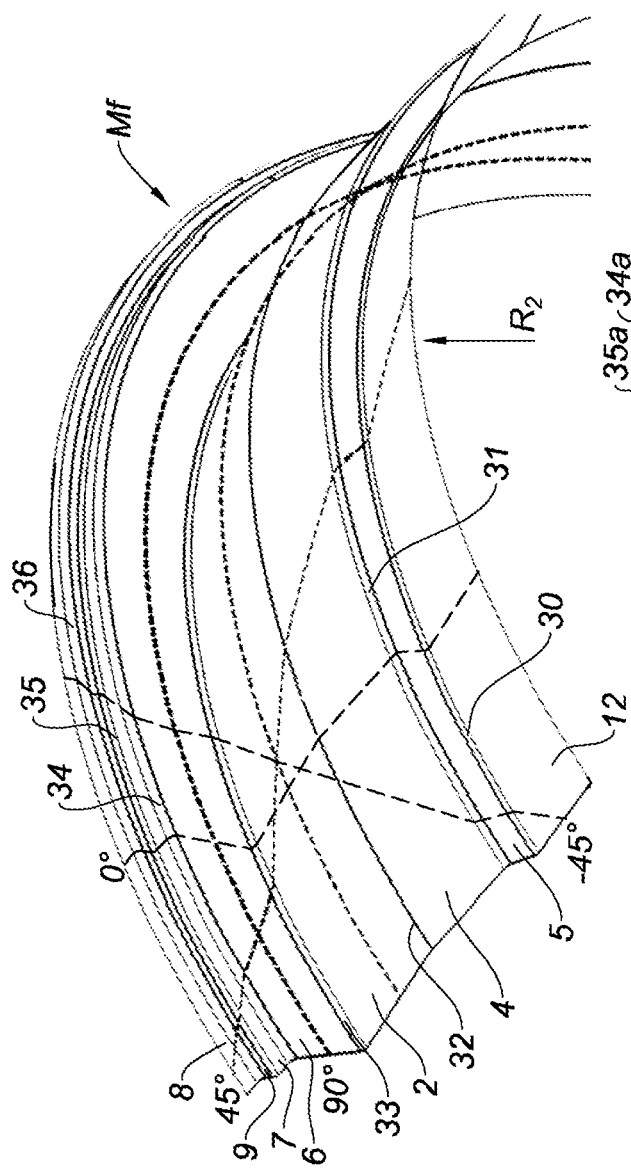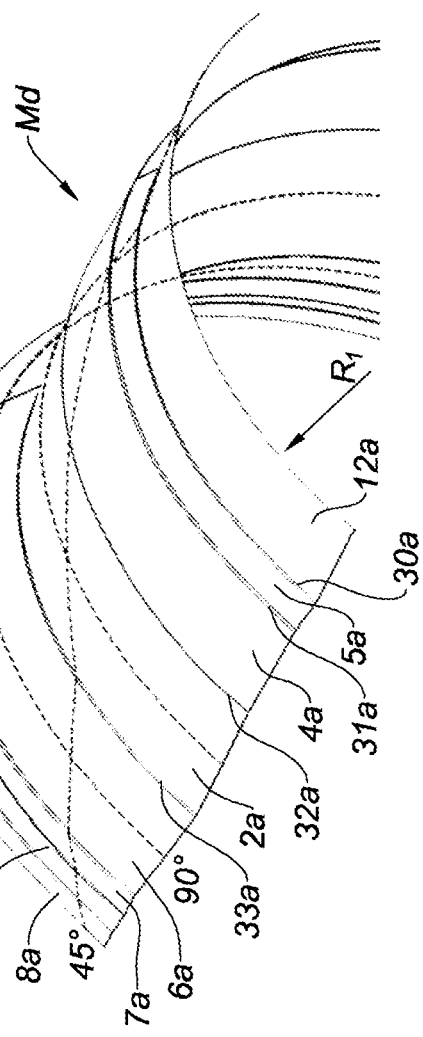

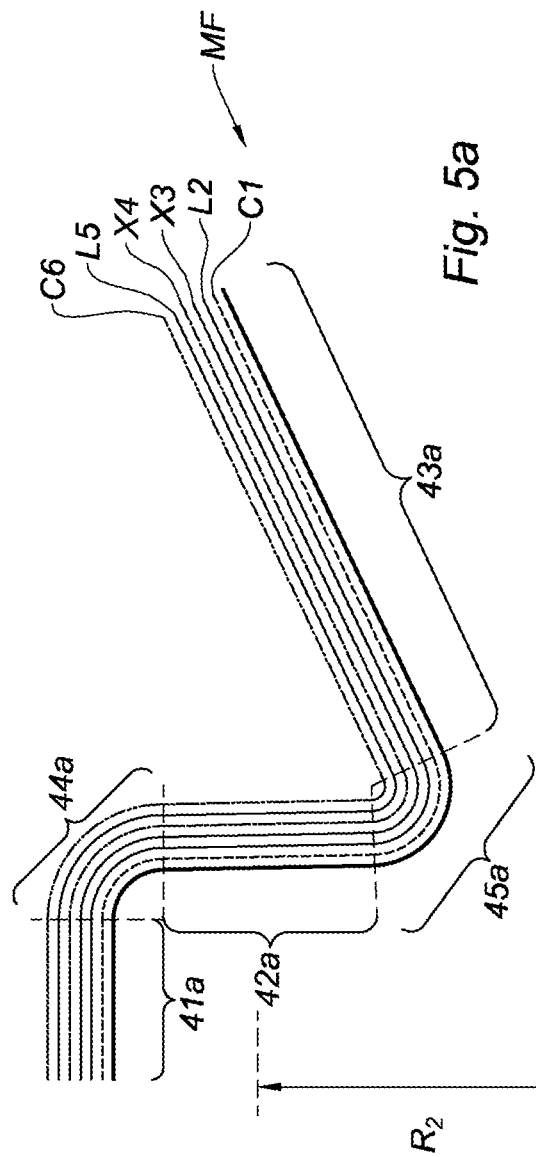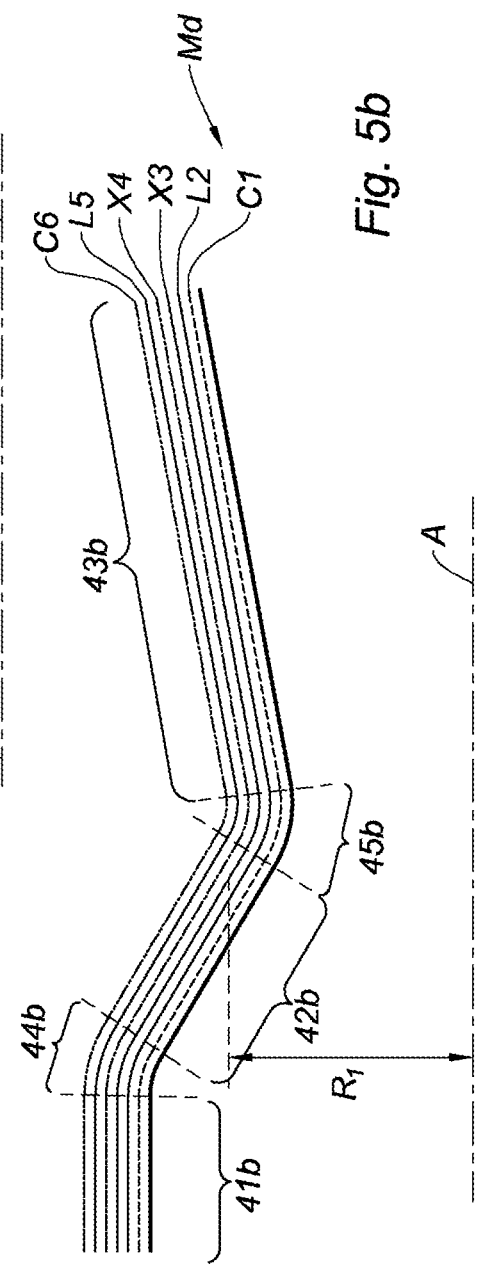

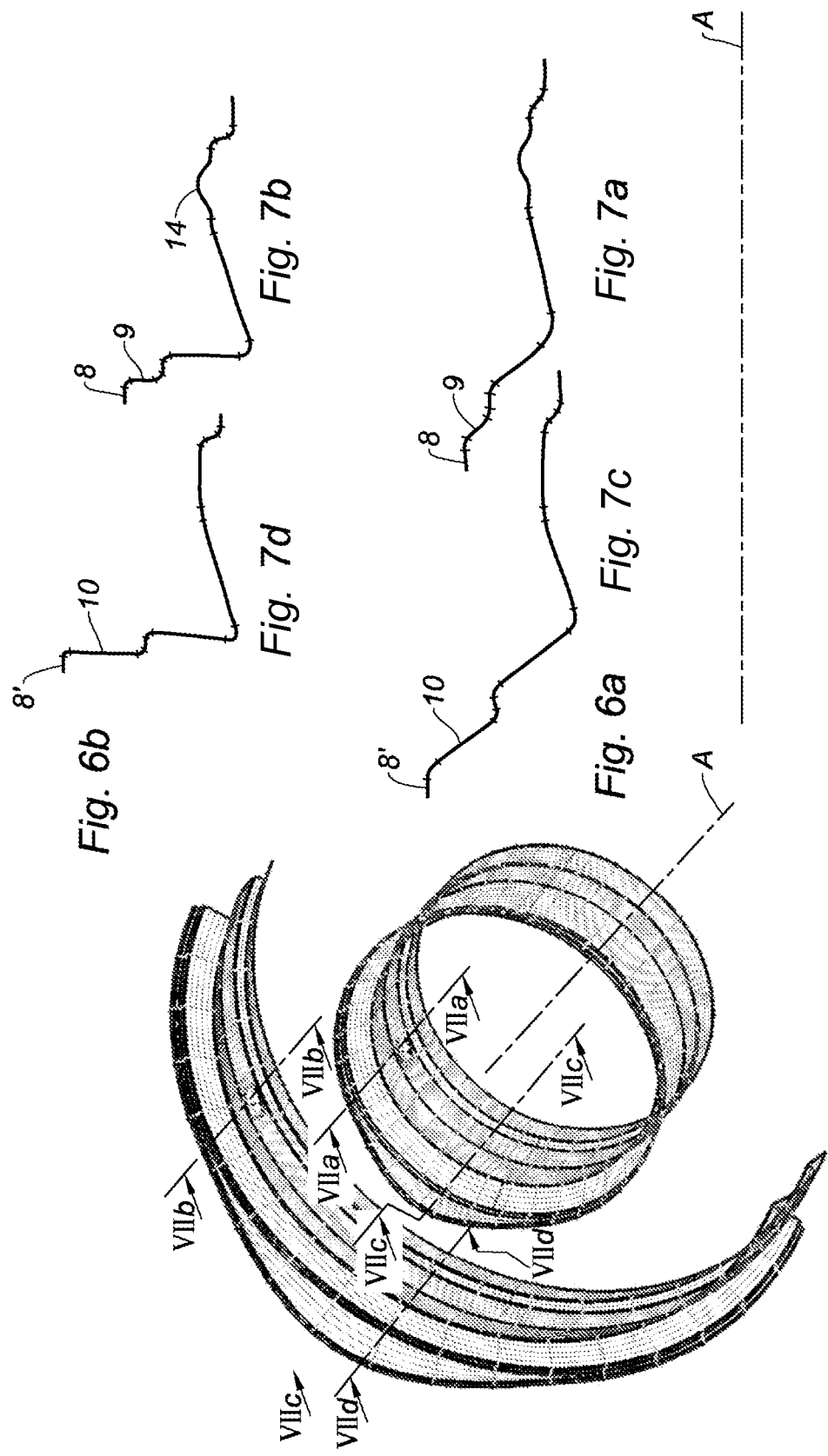

METHOD FOR MANUFACTURING A PREFORM FOR COMPOSITE MATERIALS

CROSS-REFERENCE TO RELATED APPLICATIONS

This application is a divisional application of U.S. application Ser. No. 16/240,092, filed on Jan. 4, 2019, which is a continuation of International Application No. PCT/FR2017/051835, filed on Jul. 5, 2017, which claims priority to and the benefit of FR 16/56501, filed on Jul. 6, 2016. The disclosures of the above applications are incorporated herein by reference.

FIELD

The present disclosure relates to a method for manufacturing a preform comprising superposed layers of fibers, provided to form a composite material after baking an impregnating resin, as well as a preform obtained with such a method, and a turbojet engine nacelle element obtained with these preforms.

BACKGROUND

The statements in this section merely provide background information related to the present disclosure and may not constitute prior art.

To produce resistant and lightweight structural elements, particularly in the aeronautical field, it is known to prepare a textile preform from dry fibers, in particular carbon fibers, by draping parts such as fabrics, fiber ribbons or braids, which are successively deposited on a molding shape to form superposed layers.

The layers of the preform may be bonded together by various means, in particular by a consolidation resin, a heat fusible agent such as a thermoplastic organic compound, or a seam.

The preform is then impregnated with a resin, in particular by injection according to a liquid composite molding method called "LCM," or resin transfer molding called "RTM." Alternatively, it is possible to produce such a preform with parts made of fibers pre-impregnated with resin.

After baking the resin, a lightweight part is obtained which may have various shapes, comprising fibers whose density and orientation are adjusted depending on local constraints, in order to obtain high mechanical strength characteristics.

In the aeronautical field, such parts are produced to form turbojet engine nacelle elements, in particular continuous-fiber monolithic composite parts, such as thrust reverser structure frames, or acoustic or non-acoustic sandwich composite panels such as acoustic cowls of thrust reversers, air intake lips or cowls.

To produce a part with a non-developable shape, a known production method consists in draping on a molding shape, having a corresponding non-developable surface, fiber fabrics which are deformed to adapt to this molding shape by avoiding wrinkles. This method is expensive and delicate, in particular for producing uneven or complex geometric shapes.

Another known method for manufacturing a part of revolution comprising a final shape that cannot be developed, presented in particular by document WO-A2-2014044963, consists in designing a mandrel giving a predefined initial shape compared to the final shape of the part of revolution, weaving fibers together in weft and warp, wrapped on this mandrel, and finally applying a transformation of this woven preform to obtain the final shape corresponding to the part to be obtained.

This method is adapted only to the shapes of revolution and is limited, in regards to the fiber orientations on the final part, by the limitations that the weaving offers.

Moreover, the draping methods by automated depositing of fibers or layers of fibers using draping heads allow reducing draping costs, and arranging the fibers or layers of fibers in all orientations on non-developable shapes, which can be of revolution or not, in order to optimize the mass and improve the manufacturing costs.

However, with these methods, it is not possible to produce some particular shapes of the preform with the automated draping machines, such as in particular small radii or two closed angles between two portions, because of the bulk of the fiber depositing rollers whose dimensions do not allow accessing and applying fibers on surfaces in confined spaces.

SUMMARY

The present disclosure also relates to a preform comprising a plurality of superposed reinforcing layers of fibers intended to form, after baking an impregnating resin, a part made of composite materials having a final shape, which is manufactured in accordance with a method comprising any one of the preceding characteristics.

In one form of the present disclosure, a preform to form, after baking an impregnating resin, a part made of composite materials having a final, non-developable shape is provided. The preform includes a plurality of successive layers having an initial shape substantially of revolution having an initial global radius of curvature about a longitudinal axis. The initial shape includes an open contour about the longitudinal axis and the initial global radius of curvature is increased to a final global radius of curvature. Also, the pre-form is configured to have the initial global radius of curvature up to a final global radius of curvature in order to close the folding radii of curved segments of the initial shape to form a plurality of superposed reinforcing layers of fibers that form the part made of composite materials. The part made of composite materials has a final shape with the final global radius of curvature about the longitudinal axis and the curved segments form the folding radii connecting substantially straight segments in at least one longitudinal direction.

Advantageously, each curved segment has an average developed length in the longitudinal or transversal section substantially equal to the developed length of the associated boundary layer in this section.

Particularly, the preform may include, about the longitudinal axis in the initial shape, a conical portion connected by curved segments to cylindrical segments, this conical portion straightening to give a substantially planar portion in the final shape.

Particularly, the preform may include a thickness comprised between 1 and 8 mm, and folding radii of the curved segments comprised between 5 and 30 mm.

Particularly, the preform may include local geometrical singularities, such as bosses.

Particularly, the preform may include an initial shape having a closed circular contour about the longitudinal axis, intended to give a final shape forming an area less than or equal to 180° about this axis.

Particularly, the preform may include a number of fiber reinforcing layers which is variable.

Particularly, the preform may include at least one layer comprising fibers oriented longitudinally or transversely.

Advantageously, the preform includes fibers of superposed layers having predominantly orientations of 90°, +30°, and −30°, compared to the orientation of 0° which the angle of a plane is passing through the longitudinal axis.

The present disclosure further relates to a turbojet engine nacelle part produced from a preform comprising any one of the preceding characteristics.

The present disclosure further relates to a turbojet engine nacelle part produced by partial or total superposition of at least two preforms comprising any one of the preceding characteristics In this case, at least one of the preforms may have a thickness decreasing towards the end of the overlap zone with the other preform.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 shows the final shape substantially of revolution of a preform obtained with a method according to the present disclosure;

FIG. 1a shows a longitudinal section of the final shape of the preform of FIG. 1;

FIG. 2 shows the final shape of a preform including a local flare and a boss according to a variant of the present disclosure;

FIGS. 3a and 3b respectively show an initial shape and a final shape obtained with the method according to the present disclosure;

FIGS. 3c and 3d respectively show, alternatively, an initial shape and a final shape obtained with the method according to the present disclosure;

FIGS. 4a and 4b respectively show an initial shape and a final shape showing orientations of the fibers of the superposed layers obtained with the method according to the present disclosure;

FIGS. 5a and 5b respectively show a longitudinal section of a final shape and an initial shape showing the dispositions of different layers of fibers in thickness with a stacking sequence of these layers;

FIGS. 6a and 6b respectively show an initial shape and a final shape including bosses; and FIGS. 7a, 7b, 7c and 7d respectively show different cut-outs of initial and final shapes in the longitudinal planes VIIa-VIIa, VIIb-VIIIb, VIIc-VIIc, and VIId-VIId.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIGS. 1 and 1a show the final shape of the surface of a part extending in an area of 180° about a longitudinal axis A, comprising a succession of cylindrical portions 4, 7, 8, conical portions 2, 5, 12, and radial planar portions 6, 9.

These different portions and zones are connected together by joining radii 30, 31, 32, 33, 34, 35, 36, having in a longitudinal cutting plane reduced folding radii to form pronounced angles. The folding radii may particularly have values comprised between 5 and 30 millimeters, as permitted by the folding of the fibers of the superposed layers of the preform.

The final shape has a complex geometry forming a non-developable surface, which, applied to a preform, cannot be draped directly with the conventional automated draping means for depositing continuous fibers. This difficulty is due particularly to the closed angles between the portions, such as the portions adjacent to the joining radii 30, 33, 35, and the too small radii that do not allow access to conventional draping heads, as well as to the significant variations in global radius of curvature of the different segments compared to the longitudinal axis.

It is understood that the developable term relating to the surface of the preform, designates a curved surface designed as being able to develop by an unfolding in order to be entirely in the same plane. It is therefore at least one surface allowing at any point to pass a line belonging to this surface. Conversely, a non-developable surface cannot, whatever the folding, unfolding, deployment or extension, be without a cutting or a wrinkle entirely in the same plane.

FIG. 2 shows another example of a complex part shape that can be produced according to the method of the present disclosure, comprising a general shape about a longitudinal axis A containing zones that are not of revolution about this axis, nor continuous with the general form.

The complex shape includes a partially cylindrical outer rim 8, locally having a continuous protrusion 8' with this cylindrical portion, which is joined to the part by an extension 10 towards the outside of the radial plane 9.

The complex shape also has a local geometrical singularity which is a boss 14 on a cylindrical portion 4 of the part. In the same way, this non-developable preform cannot be directly produced with automated draping means for placing conventional fibers.

FIGS. 3a and 3b show a detail of a part zone which can be produced according to the present disclosure, respectively representing an initial draping shape surface Md corresponding to the final shape surface Mf of the part. The initial shape Md allows the draping by an automated draping means.

The final shape Mf includes, about a longitudinal axis A, a portion substantially in a radial plane 22b, and a substantially cylindrical portion 20b of radius R2. On the initial shape Md, the corresponding substantially cylindrical portion 20a includes a radius R1. The two portions form together in a longitudinal plane an angle α2 equal to 90°. The ratio of the R2/R1 radii during the deployment is called the similarity ratio K, equal to 2 in this example.

On the initial shape Md, the conical portion 22a will become a radial portion 22b. The angle α1 formed between the portions 20a and 22a in a longitudinal plane is such that sin(180°−α1)=1/K=R1/R2. So, we have α1=150°.

In a longitudinal plane, the initial joining radius 16a between the portions 20a and 22a becomes, after deployment, the final joining radius 16b between the portions 20b and 22b.

If the final joining radius 16b is an arc of a circle, the initial joining radius 16a is not perfectly circular, but such that the longitudinal segments of these initial 16a and final 16b radii have the same curvilinear length, and that at any corresponding curvilinear distance between these two segments, the ratio of the respective circumferential carrier radii of each of the points is equal to the chosen similarity coefficient K.

The shape according to FIG. 3a being more open, an angle of 150° is obtained between the two adjacent portions to be draped, which gives a compatible accessibility with the current automated draping machines for placing fibers.

With the method according to the present disclosure, it is possible to obtain parts made by automated draping of fiber placement having different final angles between adjacent portions, which can be particularly very tightened, in particular less than 90°, with a very low folding radius connecting them.

In some cases, it is possible to choose a similarity ratio K greater than 2 so that the initial angle between two adjacent portions is sufficiently open, at least 150°, for easy draping with an automated draping machine.

FIGS. 3c and 3d show respectively an initial shape Md specific to the automated draping, and an associated final shape Mf composed of two conical portions 20d, 22d with opposite directions connected by a reduced joining radius 16d.

For a final angle $\alpha 4$ between the two conical portions 20d, 22d of a value of 60°, by choosing a similarity ratio K=3.5, the draping shape presents an angle $\alpha=2\times a\cos(\cos(60°/2)/K)$ namely about 151° between the portions 20c and 22c, which allows draping the part on the initial draping shape Md with an automated draping method.

FIGS. 4a and 4b respectively show the initial shape and the final shape of a part similar to that shown in FIG. 1, including a rear cylindrical portion 12 of global initial R1 and final R2 radius of curvature.

Various orientations of fiber layers useful to give the desired mechanical strength are presented, in particular the longitudinal orientation 0°, the circumferential orientation 90°, and orientations +45° and −45° inclined compared to these main orientations, presented as an example. All other inclination angles are possible.

On the final shape, the closed angles between the cylindrical 2, 7, 12 and radial 5, 6, 9 adjacent portions, do not allow draping the surface directly with an automated draping means for depositing fibers, comprising a depositing head that cannot properly access these zones to deposit fibers therein.

In order to allow the draping of the part in all the desired orientations with an automated draping means for depositing fibers, particularly in closed angles, a draping tool is used according to the initial shape Md shown in FIG. 4a, which is a transformation compared to the final shape Mf of FIG. 4b in order to open the closed angles and bring them to values of at least 150°.

On such an initial draping shape, it is possible to apply all the usual rules related to the automated draping by fiber placement such as dispositions of parallel ribbons, dispositions of series of angled ribbons, orientation of series of substantially curvilinear ribbons, reorientation to limit curvature within a ribbon, called steering, choice of trajectories closest to tangents to surface on the width of a ribbon or series of ribbons, aliasing and partial overlap angled between two series of ribbons to keep, along the circumference of the part, the orientation of the layer substantially at the same angle with respect to 0°.

Advantageously, the manufacturing method may include a preliminary step of determining a first boundary reinforcing layer at a curved segment comprising a folding radius connecting two substantially straight segments which, in a longitudinal plane depending on the orientation of its fibers and its positioning in the thickness of the segment compared to the other reinforcing layers, hinders the increase in length developed during the transformation between the initial draping shape and the final shape of the preform.

In a similar manner, the manufacturing method may include a preliminary step of determining a second boundary reinforcing layer at a curved segment which, in the transversal section depending on the orientation of its fibers and its positioning in the thickness of the segment compared to the other reinforcing layers, hinders the increase in length developed during the transformation between the initial draping shape and the final shape of the preform.

For these boundary layers in their respective directions, the smallest variation in the developed lengths is obtained, which allows calculating in advance the initial draping shape of the preform allowing to drape the desired set of fiber layers thereon, and obtaining during the transfer a preform adapted to the final shape of the desired part.

FIGS. 5a and 5b respectively have a section in a longitudinal plane of a final shape Mf of a part having an average radius R2 about the longitudinal axis A, and an initial shape Md of the corresponding preform having an average radius R1.

The final shape Mf includes a cylindrical portion 41a, a radial planar portion 42a and a conical portion 43a, linked together by joining radii 44a, 45a. The part is composed of 6 layers of superposed fibers and marked C1, L2, X3, X4, L5 and C6.

The fiber layers are continuous layers, as obtained by juxtaposed placement of ribbons of carbon, glass fibers or other mineral or organic fibers, suitable for the depositing by an automated fiber placement means.

As an example, the end layers C1, C6 are layers of fibers in a transverse sectional plane at 90°, the adjacent layers L2, L5 are fiber layers in a longitudinal plane at 0°, the central layers X3, X4 are fiber layers in inclined orientations between the two main orientations (for example +45° and −45°, or +30° and −30°, or other symmetrical or non-symmetrical angles compared to a main direction).

When deploying the initial shape Md to the final shape Mf, the fibers may move apart transversely to their direction, or contract along their length by corrugation, covering a shorter length on the surface of the part, but they cannot lengthen at more than 0.1% which is not significant.

The master layer in thickness, for each of the main directions of transverse sectional and longitudinal curvature, is defined in a radial shape and parallel to a curved direction, as being either the innermost from the radius when the curvature decreases during the transformation between the initial shape Md and the final shape Mf, or the outermost from the radius when the curvature increases during this same transformation.

Thus, in the example of FIGS. 5a and 5b, in the circumferential direction, the layer C1 circumferential to the average radius which increases during the transformation between the initial shape Md and the final shape Mf, is the circumferential transformation master layer. The circumferential radii of the draping shape are calculated compared to the inner radii of the final shape layer C1.

In the longitudinal direction, at the joining radii 44, 45, the angles close during the transformation between the initial shape Md and the final shape Mf, the master layers are the layers external to the curved zones, i.e. the layer L5 for the joining radius 44 and the layer L2 for the joining radius 45.

The initial draping shape Md is then calculated by applying the similarity coefficient K to the master layers in the circumferential direction for the calculation of the circumferential generators, and by positioning these generators at distances such as seen in the thickness of the preform, the lengths of the longitudinal segments of the longitudinal master layers are identical between the initial draping shape Md and the final shape Mf.

FIG. 6a shows an initial shape draped over a draping tool having a closed contour about the longitudinal axis A, including on the cylindrical portion 4 a boss 14 turned towards the outside, as well as a local protrusion of the cylindrical portion 8. The global initial radius of curvature is R1.

FIG. 6b shows the final shape obtained after a cut-out of the initial shape in a longitudinal plane, then a straightening in order to obtain a final shape including a global final radius of curvature R2 which is twice the global initial radius of curvature R1. The final shape is disposed along an area of 180° about the longitudinal axis A.

The pairs of FIGS. 7a, 7b, and 7c, 7d show the initial draping and final longitudinal sections respectively related to the current zone containing the local boss 14, and to the current zone containing the local protrusion 8. The same dispositions as above are applied between the initial draping shape and the final shape which allows, with the method, draping with an automated draping means for depositing ribbons, a shape with complexities that are not of revolution.

Generally, a final shape can be produced in an area other than 180°, particularly less than 180°. In particular, an area of 120° can be produced to form a complete circle in three similar elements, or of 90° with a complete circle in four similar elements.

Even more generally, the draping may be uniform over the entire surface of the part, or include fiber layers that do not extend over the entire surface.

Generally, a part can be formed by assembling two or more preforms. The assembling can be done by completely superposing one preform over another.

The assembling can also be produced by partial overlap of a peripheral zone of a preform on another preform. In this case, the number of layers of at least one of the two preforms is decreasing towards the end of the preform in the overlap zone according to a principle known to those skilled in the art, in order to limit the over-thicknesses and to improve the continuity of the mechanical properties between the two preforms.

For this latter principle, the number of layers is typically reduced to a single layer of fibers or two layers of fibers, a thickness regression of length-to-thickness ratio comprised between three and ten is applied. For example, for a layer of thickness one, one layer is decreased every ten units of width.

More generally, the method and the part obtained can be produced from ribbons of fibers called dry fibers, that is to say without consolidation resin, or only from fibers provided with a product allowing to adhere the layers to each other during the draping.

The preform can be compacted during forming on the final shape in order to calibrate the layer thicknesses. The part is then consolidated by an LCM method such as infusion, RTM, or another method.

Optionally the fiber ribbons may comprise previously woven or braided fibers.

The present disclosure is not limited to the unidirectional continuous fiber preforms, it may contain a portion of fiber fabrics such as taffeta, twill, satin. Optionally, local fibrous reinforcements may be part of the sequence of the fiber layers of the part.

The method may use fibers pre-impregnated with thermosetting resin, or alternatively, fibers pre-impregnated with thermoplastic matrix, which may be thermo-mechanically consolidated during or after the transformation into the final shape.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A preform of a composite material part having a final shape with a final global radius of curvature about a longitudinal axis and curved segments forming folding radii connecting substantially straight segments in at least one longitudinal section, the preform comprising:
    a non-developable shape formed from a plurality of superposed reinforcing layers of fibers having an initial shape substantially of revolution, wherein the initial shape has an initial global radius of curvature less than the final global radius of curvature of the final shape and an open contour about the longitudinal axis, and the plurality of superposed reinforcing layers of fibers having the initial shape are configured to form the final shape of the composite material part and close the folding radii of the curved segments connecting the substantially straight segments in the at least one longitudinal section after baking an impregnating resin of the preform.

2. The preform according to claim 1, wherein each curved segment has an average developed length in at least one longitudinal section or in a transversal section substantially equal to a developed length of an associated boundary layer in that section.

3. The preform according to claim 1 further comprising, about the longitudinal axis in the initial shape, a conical portion connected by curved segments to straight segments, the conical portion straightening to give a substantially planar portion in the final shape.

4. The preform according to claim 1 further comprising a thickness between 1 and 8 mm, and the folding radii of curved segments is between 5 and 30 mm.

5. The preform according to claim 1 further comprising local geometrical singularities.

6. The preform according to claim 5, wherein the local geometrical singularities are bosses.

7. The preform according to claim 1, wherein the initial shape includes a closed circular contour about the longitudinal axis such that the final shape forms an area less than or equal to 180° about the longitudinal axis.

8. The preform according to claim 1, wherein a number of fiber reinforcing layers is variable.

9. The preform according to claim 1, wherein at least one layer among the plurality of reinforcing layers comprises fibers oriented longitudinally or transversely.

10. The preform according to claim 1, wherein fibers of the superposed reinforcing layers have orientations of 90°, +30° and −30°, compared to an orientation of 0° which is an angle of a plane passing through the longitudinal axis.

11. A turbojet engine nacelle part comprising a preform according to claim 1.

12. A turbojet engine nacelle part comprising partial or total superposition of at least two preforms according to claim 1.

13. The turbojet engine nacelle part according to claim 12, wherein at least one of the preforms among the at least two preforms has a thickness decreasing towards an end of an overlap zone with the other preform.

14. A method for manufacturing the preform of the composite material part having the final shape with the final global radius of curvature about the longitudinal axis and curved segments forming folding radii connecting substantially straight segments in the at least one longitudinal section according to claim 1, the method comprising:

depositing successive layers of fibers on a surface of a draping tool giving the non developable shape formed from the plurality of superposed reinforcing layers of fibers having the initial shape substantially of revolution, the initial shape having the initial global radius of curvature and the open contour about the longitudinal axis; and deploying the preform by increasing the initial global radius of curvature up to the final global radius of curvature of the final shape in order to close the folding radii of the curved segments.

* * * * *